United States Patent [19]
Vanhaeren et al.

[11] Patent Number: 6,087,454
[45] Date of Patent: *Jul. 11, 2000

[54] CURABLE ELASTOMERIC COMPOSITIONS AND A PROCESS TO PRODUCE CURABLE ELASTOMERIC COMPOSITIONS

[75] Inventors: Gerard Marie Vanhaeren, Rixensart, Belgium; Avinash Chandrakant Gadkari, Houston, Tex.

[73] Assignee: Exxon Chemical Patents, Inc., Bayton, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,882

[22] PCT Filed: Jul. 3, 1996

[86] PCT No.: PCT/EP96/02977

§ 371 Date: Feb. 2, 1998

§ 102(e) Date: Feb. 2, 1998

[87] PCT Pub. No.: WO97/02305

PCT Pub. Date: Jan. 23, 1997

[30] Foreign Application Priority Data

Jul. 5, 1995 [GB] United Kingdom .................. 9513713

[51] Int. Cl.[7] ..................................................... C08F 36/00
[52] U.S. Cl. ................................... 525/331.9; 525/332.1; 525/332.5; 525/332.7
[58] Field of Search ............................. 525/331.9, 332.1, 525/332.5, 332.7

[56] References Cited

U.S. PATENT DOCUMENTS

| | | |
|---|---|---|
| 3,392,154 | 7/1968 | Baldwin . |
| 3,419,534 | 12/1968 | Goodman et al. . |
| 4,118,427 | 10/1978 | Rhein et al. . |
| 4,302,351 | 11/1981 | Gas et al. . |
| 4,855,382 | 8/1989 | Vanhaeren . |
| 4,908,408 | 3/1990 | Boutillier et al. . |
| 4,939,184 | 7/1990 | Kennedy . |
| 4,987,200 | 1/1991 | Datta et al. . |
| 5,064,902 | 11/1991 | Boutillier et al. . |
| 5,200,469 | 4/1993 | Hous . |

FOREIGN PATENT DOCUMENTS

| | | |
|---|---|---|
| 684114 | 1/1967 | Belgium . |
| 041 192 | 12/1981 | European Pat. Off. . |
| 294 271 | 12/1988 | European Pat. Off. . |
| 325 997 | 8/1989 | European Pat. Off. . |
| 1719 265 | 2/1967 | Germany . |
| 1803 038 | 10/1968 | Germany . |
| 1 803 038 | 6/1969 | Germany . |
| 2-202909 | 8/1990 | Japan . |
| 1141226 | 1/1969 | United Kingdom . |
| 1195214 | 6/1970 | United Kingdom . |
| WO 84/01157 | 3/1984 | WIPO . |

OTHER PUBLICATIONS

Polyurethane Powder Coating System—Huls, PU Raw Materials Data Sheet (Apr. 1979).

"Properties of Polyisobutylene Polyurethane Block Copolymers: 2. Macroglycols produced by 'infer' Technique," T. A. Speckhard, P. E. Gibson, S. L. Cooper and V. S. C. Chang and J. P. Kennedy, Polymer, vol. 26, Jan., pp. 55–69 (1985).

"Properties of polyisobutylene polyurethane block copolymers: 3. Hard segments based on 4, 4'-dicyclohexylmethane diisocyanate ($H_{12}$MDI) and butane diol," T. A. Speckhard, K. K. S. Hwang, S. L. Cooper and V. s. C. Chang and J. P. Kennedy, Polymer vol. 26, Jan., pp. 70–77 (1985).

"Rubber Technology," M. Morton, Van Nostrand Reinhold ed. NY, p. 294–314, (1987).

"Encyclopedia of Polymer Science and Engineering," (Isobutylene Polymers), John Wiley & Sons, Inc., vol. 8, pp. 423–443 (1987).

"Rubber Technology Handbook," Hanser Publishers, NY, pp. 89, 90, 92 and 93 (1989).

Primary Examiner—Edward J. Cain
Attorney, Agent, or Firm—Myren B. Kurtzman; Brent M. Peebles; Joseph F. Reidy

[57] ABSTRACT

This invention relates to a process to produce curable and/or cured elastomeric compositions and the curable and/or cured compositions so produced. More specifically, in a preferred embodiment, this invention relates to elastomers containing hydroxyl and/or amine functionality curable and/or cured with a blocked polyisocyanate. Preferred elastomers include isobutylene based elastomers.

13 Claims, No Drawings

CURABLE ELASTOMERIC COMPOSITIONS AND A PROCESS TO PRODUCE CURABLE ELASTOMERIC COMPOSITIONS

FIELD OF THE INVENTION

This invention relates to a process to produce curable and/or cured elastomeric compositions and the curable and/or cured compositions so produced. More specifically, in a preferred embodiment, this invention relates to elastomers containing hydroxyl or amine functionality curable and/or cured with a polyisocyanate. Preferred elastomers include isobutylene based elastomers.

BACKGROUND OF THE INVENTION

Green (uncured) elastomers do not have the requisite strength necessary for the many desirable uses ranging from hoses and cable coatings to tires and insulating materials. Several cure systems are known and used in practice to crosslink various elastomers and to produce compositions having superior properties. More specifically, various cure systems are described for polyisobutylene based elastomers, see for example Rubber Technology, M. Morton, pp.294–314, Van Nostrand Reinhold ed. New York 1987. Polyisobutylene based elastomers containing a minor portion of a conjugated diolefin known as butyl rubber, can be cured by three basic types of cure systems, by sulphur and organic accelerators such as thiurams or dithiocarbamates, by dioxime and related dinitroso compounds with lead oxide and/or a sulphur donor, or by phenol formaldehyde resins containing reactive methylene groups with or without additional activators. Zinc oxide and stearic acid are also usually added. Halogenated isobutylene copolymers can be cured by zinc oxide, usually accelerated by thiurams and thioureas, by zinc oxide and a bifunctional dienophile such as bismaleimide such as disclosed in U.S. Pat. No. 5,200,469, by diamines such as hexamethylene diamine carbamate, or by reactive phenolic resins and zinc oxide. Essentially all these cure systems also require an acid scavenger, the acid generated during curing reaction being either hydrogen sulfide in the case of sulphur cure, or hydrochloric- or hydrobromic acid in the case of halogenated polymers.

Likewise, low molecular weight polyolefin or polyisoolefin based elastomers containing a low level of chemically bound functionality such as an hydroxyl or an amine can be conveniently blended with and cured by an unblocked or blocked polyisocyanate. For example, U.S. Pat. No. 4,939,184 discloses the preparation of flexible polyurethane foams made by reacting a low molecular weight polyisobutylene having two or three terminal hydroxy groups with a polyisocyanate in the presence of a blowing agent. The molecular weight of polyisobutylene is limited to within the range of 1,000 to 10,000, preferably within the range of 1,500 to 7,000. When molecular weight exceeds 10,000 viscosity becomes extremely high and blowing becomes difficult. Urethane compositions based on low molecular weight polyisobutylene polyol containing terminal hydroxyl groups and reacted with an organic polyisocyanate compound are also disclosed in JP.2-202909. The polyisobutylene polyol described as suitable in JP.2-202909 has a number average molecular weight $M_n$ between 700 and 8,000, and preferably between 1,000 and 5,000. Unfortunately, however, when $M_n$ of the polymer is increased to above 8000, the composition becomes highly viscous, fluidity decreases, complete injection becomes impossible during casting, impregnation and coating processes and insulation defects result. These difficulties with higher molecular weight polymers result in part from using polyisocyanate containing free isocyanate groups as curing agent. Higher $M_n$ polymers are typically heated to make them amenable to the blending process. The polyisocyanate will cure the polymer at the higher temperatures needed to soften the polymer to make it amenable to blending. Thus polyisocyanates containing free isocyanate groups are not traditionally used to cure higher $M_n$ polymers. Note that JP 2-202909 states that their compositions are cured by heating to between 90 and 170° C., but are blended at lower temperatures. Higher $M_n$ polymers are generally heated to these higher temperatures (90° C. to 170° C.) to permit blending to occur at all. Thus a polymer/polyisocyanate mixture heated to between 90 and 170° C. would crosslink prematurely during blending, could not be processed into the desired shape, making the blend unsuitable for any practical use. Hence polyisocyanates are not generally considered appropriate for curing high $M_n$ polymers.

Diisocyanate containing free isocyanate groups has also been used to cure copolymers of isobutylene and modified styrene containing tertiary aminoalcohol groups in EPA 325 997. EPA 325 997 discloses diisocyanate curing of polymers having a molecular weight of 700 to 200,000, however only exemplifies blends of up to about 30,000 weight average molecular weight $M_w$, and about 8,600 $M_n$, as measured by gel permeation chromatography. Further the examples are blended in solution at room temperature. The solution gels in a few minutes. Mixing conventional unblocked polyisocyanate with high molecular weight containing hydroxyl or amine functionality is unpractical and leads to premature crosslinking during mixing even at moderate temperature. In contrast the invention herein provides a way to safely mix, mold, and cure high molecular weight elastomer compositions with polyisocyanates without causing the undesirable side effects. In particular this invention describes the use of a blocked polyisocyanate that allows safe mixing and incorporation of the compound at temperature as high as 120 to 150° C. without inducing undesirable crosslinking during mixing.

SUMMARY OF THE INVENTION

This invention relates to a process to produce curable and/or cured elastomer compositions and the curable and/or cured compositions so produced. In particular this invention relates to a process to produce a curable elastomeric composition comprising combining an elastomeric polymer, having an $M_w$ of 60,000 or more and containing hydroxyl and/or amine functional groups with a blocked polyisocyanate at a temperature below the temperature that will unblock the isocyanate. Further this invention also relates to a process to cure the composition by heating it to a temperature above the temperature that will unblock the polyisocyanate.

DETAILED DESCRIPTION

In a preferred embodiment, this invention relates to a process to produce a curable elastomeric composition comprising combining an elastomer having an $M_w$ of 60,000 or more, preferably 80,000 or more, even more preferably 100,000 or more, even more preferably 120,000 or more, and containing hydroxyl and/or amine functional groups with a blocked polyisocyanate at a temperature below the temperature that will unblock the isocyanate functionalities. In a preferred embodiment, the elastomer has an Mw of up to about 1,000,000, more preferably up to about 2,000,000. In a preferred embodiment the mixing temperature is above 90° C., preferably above 100° C., even more preferably above 110° C., even more preferably above 120° C., but below the temperature that will unblock the isocyanate, preferably below about 150° C.

Preferred elastomers include any elastomer having hydroxyl or amine functionality bound thereto. Preferred examples of elastomers include but are not limited to ethylene propylene rubber, ethylene-propylene-diene monomer rubber, polyisobutylene, butyl rubber, or any other polymer of isoolefin optionally copolymerized with conjugated diene (such as isoprene), styrenics (such as styrene and/or alkyl substituted styrene), and the like. Particularly preferred elastomers include isobutylene-isoprene copolymer, isobutylene-paramethylstyrene copolymer and the like.

The elastomers used in this invention, typically have more than two hydroxyl or amine functional groups attached to the elastomer. Hydroxyl and amine groups are preferred functional groups, however any functional group that will react with the isocyanate group will perform in this invention. Such hydroxyl or amine functionalized polymers may be prepared by means known in the art. For example amine functionalized ethylene propylene diene monomer rubber (EPDM) is produced by the process described in U.S. Pat. No. 4,987,200. Likewise higher molecular weight isobutylene copolymers functionalized with hydroxyl groups can be produced using the process described in EPA 325 997. Furthermore any commercially available halogenated isobutylene based polymer containing a low level of halogen typically 0.5 to 2.0 mole % can be combined with an alkylamine or an amino alcohol to produce the amine or the hydroxyl functional group respectively. In a preferred embodiment the elastomer contains at least 0.02 mmoles/g of functional groups.

Blocked isocyanates which may be used in the practice of this invention are the reaction product of an organic aliphatic, cycloaliphatic, or aromatic isocyanate with monofunctional blocking agent. For the purposes of this invention and the claims thereto a blocked isocyanate is an adduct of a isocyanate compound with an isocyanate-blocking agent in theoretically calculated equivalent ratios. In a preferred embodiment the polyisocyanate compound is an organic isocyanate containing at least two isocyanate groups per molecule. Preferred organic polyisocyanates include, aliphatic diisocyanates such as trimethylene-, tetramethylene-, pentamethylene-,hexamethylene-, dodecamethylene-, diisocyanate, or cycloaliphatic diisocyanates such as 1.4-diisocyanate-cyclohexane, 3-isocyanatomethyl-3,5,5-trimethylcyclohexylisocyanate (also called isophorone diisocyanate), 4,4$^1$-dicyclohexylmethane diisocyanate , or aromatic diisocyanates such as tolylene diisocyanate, xylylene diisocyanate, phenylene diisocyanate, 4,4'-diphenylmethane diisocyanate, naphthalene diisocyanate. Polymeric polyisocyanates such as those containing dimers or trimers of an isocyanate may also be used. In particular, polymeric polyisocyanates such as those containing dimers or trimers of tolylene diisocyanate or of 3-isocyanatomethyl-3,5,5-trimethylcyclohexylisocyanate may also be used. Such dimeric compounds contain uretidinedione groups and the trimeric compounds contain triisocyanurate groups, obtained respectively by dimerization or trimerization of isocyanate. Among the above organic polyisocyanates, the aliphatic and cycloaliphatic organic polyisocyanates are preferred. Polymeric polyisocyanates such as dimers, trimers, pentamers of tolylene diisocyanate or of isophorone diisocyanate are also suitable isocyanates for this invention.

Typical blocking agents are compounds containing an active hydrogen atom such as those based on phenols, lactams, alcohols, mercaptans, imides, imidazoles, amines, ureas, carbamic acid salts, oximes, sulfites, and active methylene e.g. diethyl malonate, ethyl acetoacetate, acetylacetone, etc. Furthermore, appropriate isocyanate-blocking agents are typically monofunctional, acidic-hydrogen containing compounds or active-methylene containing compounds which are reactive towards isocyanate groups and which will unblock from the isocyanate function at temperatures between 100° and 200° C. Suitable blocking agents are for example oxime based, such as acetoxime, methylethylketoxime, cyclohexanoxime, lactam based, such as ε-caprolactam, δ-valerolactam, γ-butyrolactam, phenol based, such as phenol, cresol, tert.-butyl phenol, imide-based, such as succinimide, phtalimide, maleimide, carbamate based, such as phenyl N-phenylcarbamate, 2-oxazolidone. Suitable blocking agents also include active-methylene based compounds such as diethyl malonate, ethylacetoacetate, methyl acetoacetate, acetylacetone, etc. Blocked isocyanates have been the subject of reviews in the literature, see for example Progress in Organic Coatings, 3, pp. 73–99 (1975) and 9, pp. 3–28 (1981) by Z. W. Wicks Jr, incorporated by reference herein for the purposes of U.S. law.

Low volatility, high boiling temperature blocking agents are preferred so as to minimize their volatilization from the curing mold during heating at curing temperature. The type of blocking agent to be used is also dictated by their unblocking rate at a given curing temperature. For example, oxime-based blocking agents are known to unblock at a lower temperature than phenol-based agents. ε- caprolactam is a very suitable blocking agent for use in this invention.

A particularly suitable blocked polyisocyanate is the product marketed by Chemische Werke Huls A. G. Marl, Germany, as IPDI B 1530. It is based on 3-isocyanatomethyl-3,5,5-trimethylcyclohexylisocyanate (also called isophorone diisocyanate and abbreviated as IPDI),and it contains 15% by weight isocyanate, with all isocyanate functions being blocked with ε-caprolactam. Such compounds are described in U.S. Pat. No. 4,302,351.

The elastomer having an $M_w$ of 60,000 or more containing hydroxyl and/or amine functional groups is then blended with a blocked polyisocyanate at a temperature that allows blending but does not unblock the isocyanate to any significant extent. The extent of unblocking reaction can be conveniently determined by measuring the torque increase as a function of time using an oscillating disc rheometer in accordance with ASTM D 2084. Moreover, scorch time -or cure onset- expressed as the time to rise above the minimum torque by 1 or 2 torque units at a given temperature can also be measured using an oscillating disc rheometer in accordance with ASTM D 2084 and is a typical measure in the rubber industry of how fast a cure reaction begins to take place. The particular temperature chosen for blending will vary according to the blocked polyisocyanate chosen and the elastomer or elastomers the blocked polyisocyanate is to be blended with. Typical unblocking temperatures are given in the literature (see for example p.120, in Polyurethanes, Chemistry and Technology, Part I, Chemistry, by J. H. Saunders and K. C. Frisch, in High Polymers , Vol. XVI, Interscience Publishers (1962). Unblocking temperature can also be determined by differential scanning calorimetry (see for example T. Anagnostou and E. Jaul, J. Coat. Tech., 53, 35 (1981), this method measures the heat evolution as a function of temperature of the unblocking reaction. These references are incorporated herein for the purposes of U.S. law. As a general rule aliphatic isocyanates will unblock at higher temperatures than their aromatic counterparts.

In general the blocked polyisocyanate is mixed with the elastomer and other ingredients such as carbon black at a mole ratio hydroxyl to isocyanate (OH/NCO) or amine to isocyanate (NH/NCO) varying from 0.9:1.0 to 20:1, preferably about 1:1 to about 10:1 at a temperature below 150° C., preferably below 130° C.

A catalyst may also be added to increase the cure rate or to cure at a lower temperature. Catalysts useful for that purpose are tertiary amines such as 1,4-diazabicyclo [2.2.2.] octane (DABCO), or N,N'-dialkyl piperazine, N,N'-dialkyl piperidine, or tin containing compounds such as dibutyltin dilaurate (DBTDL), stannous octoate, dioctyltin thiocarboxylate.

Suitable amounts of curing agent to be used include a molar ratio of bound hydroxyl (OH), or amine (NH) in the uncured initial polymer to isocyanate (NCO) contained in the curing agent of 0.9:1.0 to 20.0:1.0, preferably about 1.0:1.0 to about 20.0:1.0, more preferably of 1.0:1.0 to 10.0:1.0. It will usually be preferred to use the minimum amount of curing agent needed to attain the desired crosslink density. Suitable amounts of catalyst to be optionally used include a molar ratio of catalyst to isocyanate contained in the curing agent of 0.01 to 0.3, preferably of 0.05 to 0.2. When used, the catalyst may be mixed with the polymer first, or as the last ingredient added, but sufficient mixing time should then be allowed to ensure good dispersion.

Various rubber compounding additives and fillers may be added to the polymer such as for example, fillers including carbon black, talc, clays, silica, pigments and the like, unreactive processing oils, and suitable optional additives including antioxidants, antistatic agents, processing aids, plasticizers and the like conventionally used in the rubber compounding art. The sequence and conditions of mixing employed are well known to the rubber compounder, the mixing being perform ed to thoroughly and uniformly disperse all components of the composition in the polymer without excessive heat buildup.

Thereafter curing of the composition can be effected at temperatures above the temperature at which the isocyanate functionalities unblock, typically at temperatures of about 150 to about 200° C. The curing temperature and time can readily be established with a few experiments utilizing e.g., the Monsanto Oscillating Disc Rheometer described in detail in American Society for Testing and Materials, Standard ASTM D 2084.

Such compositions exhibit very good scorch safety and good mechanical properties after cure. Heat stability of the cured compounds is also very good as evidenced by a good tensile strength retention after ageing. Partially crosslinked polymers can be conveniently obtained by adjusting the hydroxyl- or amine- to isocyanate content. Cure temperature and time can be reduced by addition of an appropriate catalyst. Moreover the addition of catalyst also enhances some mechanical properties.

Additionally one of the benefits of this invention is that the blending process can be performed in the absence of solvent, with the solvent either totally or substantially absent. By substantially absent is meant that solvent is not present in a high enough concentration to suspend or dissolve at least 50 weight % of the elastomer present, preferably at least 30 weight %, even more preferably at least 10 weight % of the elastomer present. Likewise compositions absent solvent can be produced by the process described herein. Absent solvent is defined to mean solvent is not present in the composition, preferably at less than 5 weight % of the total weight of the composition.

In a preferred embodiment the compositions described above are used to make extruded, compression molded, blow molded and/or injection molded objects. Likewise the compositions described above can also be used to produce tire components, curing membranes, insulating materials, or stoppers and linings for closures of containers.

EXAMPLES

The initial isobutylene containing polymers for the synthesis of polymers used in the examples of this invention was a copolymer of isobutylene, paramethylstyrene (PMS), bromoparamethylstyrene (BrPMS), and possibly a small amount of dibromoparamethylstyrene, marketed by Exxon Chemical Europe, Inc. and Exxon Chemical Company, a Division of Exxon Corporation under the trademark EXXPRO™. Two grades were used for the synthesis of the polymers in the examples of this invention. They were EMDX 89-1 and EMDX 93-4 and their composition in weight % was as follows in Table 1.

TABLE 1

|  | EMDX 89-1 | EMDX 93-4 |
| --- | --- | --- |
| isobutylene | 93.93 | 90.58 |
| paramethylstyrene (PMS) | 3.76 | 5.22 |
| monobromoPMS (BrPMS) | 2.31 | 4.20 |
| Total Br content | 1.10 | 2.10 |
| Mooney viscosity* | 35 ± 5 | 38 ± 5 |
| (ML 1 + 8 at 125° C.) |  |  |
| Average Mw (GPC) | 456,700 | 607,700 |
| Average Mn (GPC) | 207,000 | 228,500 |

*measured according to ASTM D 1646-81

Synthesis of Polymer A

Polymer A is an isobutylene-paramethylstyrene copolymer containing pendant hydroxyl functionality obtained by nucleophilic substitution on EXXPRO™ EMDX 89-1 using 2-(methylamino)ethanol as nucleophilic reagent. 100 g of EXXPRO™ EMDX 89-1 was dissolved in one liter of tetrahydrofuran and heated to 50–55° C. Then 8.275 g 2-(methylamino)ethanol (8 moles/mole Br) was added to the polymer solution under stirring. The solution was then heated to 60–630C. for 4 hours. The polymer was then recovered by precipitation in methanol or acetone, or a mixture of both. The polymer was further purified by washing and kneading in methanol or acetone to complete the removal of unreacted 2-(methylamino)ethanol and then dried at 60° C. under vacuum. The polymer contained no monobenzylic bromine, and the analysis as summarized below in Table 2 indicates an essentially complete conversion of monobenzylic bromine to N-methylamino ethanol functionality.

TABLE 2

| $^1$H-NMR | mole % |
| --- | --- |
| isobutylene | 97.47 |
| paramethylstyrene (PMS) | 1.85 |
| monobromo PMS (BrPMS) | 0 |
| N-methylamino ethanol PMS | 0.68 |

Polymer A thus contained thus 0.117 mmole/g of hydroxyl functionality.

Synthesis of Polymer B

The same procedure as for Polymer A synthesis was used but the starting polymer was EXXPRO™ EMDX 93-4 and 19.74 g 2-(methylamino)ethanol (10 moles/mole Br) was added. After reaction at 60–63° C. for 4 hours the recovered and washed polymer had the following composition reported in Table 3.

TABLE 3

| $^1$H-NMR | mole % |
|---|---|
| isobutylene | 96.1 |
| paramethylstyrene (PMS) | 2.63 |
| monobromo PMS | 0 |
| N-methylamino ethanol PMS | 1.267 |

Polymer B thus contained 0.213 mmole/g of hydroxyl functionality.

Synthesis of Polymer C

Polymer C is an isobutylene-paramethylstyrene copolymer containing pendant secondary amine functionality obtained by substitution of the benzylic bromine of EXX-PRO™ elastomers by an alkylamine. 100 g of EXXPRO™ EMDX 89-1 elastomer was dissolved in one liter of tetrahydrofuran. 16.7 g n-hexylamine (12 moles/mole Br) was added under stirring and the solution heated to 60–63° C. The temperature was maintained for 5 hours, the polymer was then recovered, washed and dried as previously described. The analysis of Polymer C was as follows in Table 4:

TABLE 4

| $^1$H-NMR | mole % |
|---|---|
| isobutylene | 97.47 |
| paramethylstyrene (PMS) | 1.85 |
| monobromo PMS | 0 |
| n-hexyl-NH-PMS | 0.68 |

Polymer C thus contained 0.1167 mmole/g of secondary amine functionality.

The following examples are presented to illustrate the invention. The mixing was carried out in a Brabender® mixer according to the procedure given in Table 5.

TABLE 5

| Time (minute) | Rotor speed (rpm) | Temperature (° C.) | Comments |
|---|---|---|---|
| 0 | 40 | 60 | polymer in and optionally the catalyst |
| 1 | 20 | 85 | add carbon black |
| 2 | 40 | 85–90 | all carbon black added in |
| 2 to 5 | 40 | 90 to 120° C. | |
| 5 | 40 | 120° C. | add curing agent |
| 6.5 | 40 | 120° C. | stop |

The compound was then passed 4–5 times on a rubber mill to obtain a 2 mm thick sheet.

The various formulations used in the examples are given in Table 6 for Polymer A (formulations D to H), Table 7 for Polymer B (formulations J to P), and Table 8 for Polymer C (formulations Q to T). All parts are by weight based on 100 parts of polymer. A general purpose furnace (GPF) carbon black N660 was used. IPDI B 1530, marketed by Chemische Werke Huls A. G. Marl, Germany, is a blocked polyisocyanate based on 3-isocyanatomethyl-3,5,5-trimethylcyclohexylisocyanate containing 15% by weight isocyanate, with all isocyanate functions being blocked with ε-caprolactam.

TABLE 6

| Formulation | D | E | F | G | H |
|---|---|---|---|---|---|
| Polymer A | 100 | 100 | 100 | 100 | 100 |
| Carbon black GPF N660 | 50 | 50 | 50 | 50 | 50 |
| IPDI B 1530 | 3.276 | 3.276 | 1.638 | 1.638 | 1.638 |
| DBTDL (1) | — | 0.739 | — | 0.37 | 0.739 |
| Mole ratio OH/NCO | 1 | 1 | 2 | 2 | 2 |
| Mole ratio DBTDL/NCO | — | 0.1 | — | 0.1 | 0.2 |

(1) DBTDL: dibutyl tin dilaurate

TABLE 7

| Formulation | J | K | L | M | N | P |
|---|---|---|---|---|---|---|
| Polymer B | 100 | 100 | 100 | 100 | 100 | 100 |
| Carbon black GPF N660 | 60 | 60 | 60 | 60 | 60 | 60 |
| IPDI B 1530 | 2.982 | 1.491 | 0.746 | 5.964 | 2.982 | 1.491 |
| DBTDL (1) | — | — | — | 1.346 | 0.673 | 0.336 |
| Mole ratio OH/NCO | 2 | 4 | 8 | 1 | 2 | 4 |
| Mole ratio DBTDL/NCO | — | — | — | 0.1 | 0.1 | 0.1 |

(1) DBTDL: dibutyl tin dilaurate

TABLE 8

| Formulation | Q | R | S | T |
|---|---|---|---|---|
| Polymer C | 100 | 100 | 100 | 100 |
| Carbon black GPF N660 | 50 | 50 | 50 | 50 |
| IPDI B 1530 | 3.268 | 1.634 | 0.817 | 0.408 |
| Mole ratio NH/NCO | 1 | 2 | 4 | 8 |

The formulations D, E, and R were tested to determine their scorch time at various temperatures. The results of these tests are shown in Table 9.

TABLE 9

| RHEOMETER SCORCH TIME (3° arc) (ASTM D 2084) | |
|---|---|
| Temperature (° C.) | $t_s2$ (min) |
| Formulation: D (Polymer A) (OH/NCO = 1, no DBTDL) | |
| 140 | 40 |
| 180 | 3.5 |
| Formulation: E (Polymer A) (OH/NCO = 1, DBTDL/NCO = 0.1) | |
| 125 | 70 |
| 130 | 35 |
| 140 | 13.3 |
| 150 | 7.3 |
| 160 | 4.2 |
| Formulation: R (Polymer C) (NH/NCO = 2) | |
| 120 | 68 |
| 125 | 55 |
| 130 | 32 |
| 140 | 13.7 |
| 160 | 3.7 |

Scorch time $t_s2$ (time to 2 dN.m rise above $M_L$) was measured at 3° arc amplitude.

As can be seen the rheological characterization results are quite good; these compounds can be safely processed at temperatures as high as 130° C. to 160° C. without premature crosslinking.

The formulations shown in Tables 6, 7 and 8 were tested to determine their curing characteristics such as cure time at one or two temperatures using the Monsanto Oscillating Disc Rheometer in accordance with ASTM D 2084. These formulations were then press cured at a temperature and for a time corresponding to close their time for 90% cure as determined from the rheometer cure curve $t'_{90}$. The cured specimens were then tested to determine their physical properties before and after ageing for 72 hours at 125° C. in an air circulating oven. The results of these tests are shown in Table 10 for formulations D to H, in Table 11 for formulations J to L, in Table 12 for formulations M to P, and in Table 13 for formulations Q to T.

TABLE 10

| Formulation | D | E | F | G | H |
|---|---|---|---|---|---|
| Rheometer Results (3° arc) (ASTM D 2084) | | | | | |
| Temperature (° C.) | 180 | 160 | 180 | 160 | 160 |
| $M_H$ (dN.m) | 34.8 | 57.6 | 23.3 | 35.8 | 35.8 |
| $M_H$-$M_L$ (dN.m) | 18.4 | 37.0 | 7.7 | 16.3 | 16.6 |
| $t_s2$ (min.) | 3.5 | 4.2 | 5.2 | 8.0 | 6.7 |
| $t'_{50}$ (min.) | 10.6 | 14.0 | 8.7 | 19.0 | 16.5 |
| $t'_{90}$ (min.) | 28.5 | 30.5 | 30.0 | 42.0 | 37.0 |
| Physical Properties, press cure (ASTM D 412) | | | | | |
| Cure temp. (° C.) | 180 | 160 | 180 | 160 | 160 |
| Cure time (min.) | 30 | 30 | 30 | 40 | 40 |
| Shore A hardness[1] | 42 | 49 | 38 | 43 | 44 |
| 100% Modulus (MPa) | 1.17 | 1.64 | 0.82 | 1.21 | 1.44 |
| 300% Modulus (MPa) | 4.49 | 7.60 | 1.98 | 4.81 | 5.85 |
| Tensile Str. (MPa) | 11.43 | 13.1 | 6.03 | 11.77 | 11.0 |
| Elong. at break (%) | 620 | 530 | 592 | 632 | 566 |
| Aged Properties, 72 hrs at 125° C. (ASTM D 573) results expressed as percentage of unaged property | | | | | |
| Shore A hardness | 111 | 111 | — | 101 | 104 |
| 100% Modulus | 147 | 166 | — | 132 | 123 |
| 300% Modulus | 166 | 155 | — | 128 | 123 |
| Tensile Strength | 106 | 93 | — | 82 | 93 |
| Elong. at break | 75 | 59 | — | 73 | 67 |

[1]Shore hardness was tested in accordance with ASTM D 2240.

Modulus and hardness can be varied by adjusting the OH/NCO or NH/NCO mole ratio, hence adjusting the crosslinking density. High tensile strength can also be achieved and can be further increased by addition of a catalyst as shown by comparing formulations D and E, F, G and H, I and N, K and P.

Aged properties are also very good as shown by the tensile strength retention, in particular for formulations D, E, and H comprising an isobutylene based polymer having hydroxyl groups, and formulations Q to T comprising an isobutylene based polymer having amine groups. Such ageing resistance is particularly good considering the formulations comprise neither antioxidant nor added stabilizer.

Compositions based on this invention are useful in industrial applications such as tyre components, e.g. innerliners, as curing membranes, and as stoppers and linings for closures of containers.

TABLE 11

| Formulation | J | K | L |
|---|---|---|---|
| Rheometer results, 180° C., 3° arc (ASTM D 2084) | | | |
| $M_H$ (dN.m) | 61.6 | 47.7 | 34.5 |
| $M_H$-$M_L$ (dN.m) | 39.6 | 24.5 | 11.3 |
| $t_s2$ (min.) | 3.1 | 3.8 | 5.3 |
| $t'_{50}$ (min.) | 12.3 | 12.3 | 13.0 |
| $t'_{90}$ (min.) | 45.0 | 51.0 | 52.5 |
| Physical Properties, 50 min. press cure at 180° C. (ASTM D 412) | | | |
| Shore A hardness[1] | 64 | 59 | 53 |
| 100% Modulus (MPa) | 4.43 | 3.13 | 2.20 |
| 200% Modulus (MPa) | 9.90 | 6.55 | 4.43 |
| Tensile Str. (MPa) | 10.75 | 9.24 | 6.66 |
| Elong. at break (%) | 224 | 292 | 306 |
| Rheometer results, 200° C., 3° arc (ASTM D 2084) | | | |
| $M_H$ (dN.m) | 62.5 | 44.0 | 36.4 |
| $M_H$-$M_L$ (dN.m) | 41.0 | 21.1 | 13.6 |
| $t_s2$ (min.) | 1.6 | 2.2 | 2.6 |
| $t'_{50}$ (min.) | 5.1 | 6.0 | 7.2 |
| $t'_{90}$ (min.) | 18.7 | 27.0 | 34.5 |

[1]Shore hardness was tested in accordance with ASTM D 2240.

(1) Shore hardness was tested in accordance with ASTM D 2240.

TABLE 12

| Formulation | M | N | P |
|---|---|---|---|
| Rheometer results, 160° C., 3° arc (ASTM D 2084) | | | |
| $M_H$ (dN.m) | 87.6 | 66.0 | 50.6 |
| $M_H$-$M_L$ (dN.m) | 64.3 | 41.8 | 24.0 |
| $t_s2$ (min.) | 2.8 | 4.1 | 5.5 |
| $t'_{50}$ (min.) | 12.8 | 15.0 | 16.5 |
| $t'_{90}$ (min.) | 29.5 | 36.0 | 40.0 |
| Physical Properties, press cure at 160° C. (ASTM D 412) | | | |
| Cure time (min.) | 30 | 40 | 40 |
| Shore A hardness[1] | 65 | 59 | 56 |
| 100% Modulus (MPa) | 6.42 | 4.03 | 3.13 |
| 200% Modulus (MPa) | 13.39 | 10.58 | 7.67 |
| 300% Modulus (MPa) | — | — | 11.54 |
| Tensile Str. (MPa) | 13.62 | 13.88 | 11.72 |
| Elong. at break (%) | 205 | 257 | 304 |
| Aged properties, 72 hrs at 125° C. (ASTM D 573) results expressed as percentage of unaged property | | | |
| Shore A hardness | 105 | 99 | 97 |
| 100% Modulus | 135 | 120 | 128 |
| Tensile Strength | 80 | 54 | 54 |
| Elong. at break | 60 | 60 | 57 |

[1]Shore hardness was tested in accordance with ASTM D 2240.

(1) Shore hardness was tested in accordance with ASTM D 2240.

TABLE 13

| Formulation | Q | R | S | T |
|---|---|---|---|---|
| Rheometer results, 160° C., 3° arc (ASTM D 2048) | | | | |
| $M_H$ (dN.m) | 95.0 | 73.3 | 48.0 | 37.0 |
| $M_H$-$M_L$ (dN.m) | 64.4 | 43.7 | 19.9 | 9.7 |
| $t_s2$ (min.) | 2.8 | 3.7 | 5.0 | 6.5 |
| $t'_{50}$ (min.) | 9.7 | 12.3 | 12.0 | 12.0 |
| $t'_{90}$ (min.) | 23.7 | 29.5 | 30.0 | 28.0 |
| Physical Properties, 30 min. press cure at 160° C. (ASTM D 412) | | | | |
| Shore A hardness[1] | 59 | 54 | 47 | 44 |
| 100% Modulus (MPa) | 3.70 | 1.77 | 1.44 | 1.30 |
| 200% Modulus (MPa) | 9.10 | 5.07 | 3.69 | 2.66 |
| 300% Modulus (MPa) | — | 8.75 | 6.70 | 4.71 |
| Tensile Str. (MPa) | 9.41 | 12.72 | 13.14 | 12.1 |
| Elong. at break (%) | 213 | 463 | 563 | 577 |

TABLE 13-continued

| Formulation | Q | R | S | T |
|---|---|---|---|---|
| Aged Properties, 72 hrs at 125° C. (ASTM D 573) results expressed as percentage of unaged property | | | | |
| Shore A hardness | 106 | 104 | 109 | 111 |
| 100% Modulus | 118 | 137 | 139 | 159 |
| 200% Modulus | — | 132 | 159 | 192 |
| 300% Modulus | — | — | 153 | 180 |
| Tensile Strength | 94 | 95 | 99 | 97 |
| Elong. at break | 80 | 82 | 69 | 67 |

[1]Shore hardness was tested in accordance with ASTM D 2240.

(1) Shore hardness was tested in accordance with ASTM D 2240.

Molecular weight (Mw and <n) were measured using a Waters 150C gel permeation chromatograph equipped with a differential refractive index (DRI) dectector. The system was used at 40° C. with tetrahydrofuran as the solvent. Polyisobutylene standards were used. Polystyrene gel columns were purchased from Polymer Laboratories, Ltd. in Shropshire, United Kingdom.

All documents described herein are incorporated by reference herein, including any priority documents. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A process to produce a curable elastomeric composition comprising combining a $C_4$ to $C_7$ isoolefin/p-alkylstyrene polymer having an Mw of 60,000 or more and containing hydroxyl and/or amine functional groups with a blocked polyisocyanate at a temperature below the temperature that unblocks the blocked polyisocyanate.

2. The process of claim 1 wherein the elastomer is a copolymer of isobutylene and para-alkyl styrene.

3. The process of claim 1 wherein the elastomer is a copolymer of isobutylene and paramethyl-styrene.

4. The process of claim 1 wherein the blocked polyisocyanate is a blocked aromatic polyisocyanate, a blocked aliphatic polyisocyanate, or a blocked cycloaliphatic polyisocyanate.

5. The process of claim 1 wherein the blocked polyisocyanate is present in a molar ratio of hydroxyl and/or amine to isocyanate of from 0.9:1.0 to 20.0:1.0.

6. The process according to claim 4 wherein the blocked polyisocyanate is a blocked aliphatic polyisocyanate or a blocked cycloaliphatic polyisocyanate.

7. A composition produced in accordance with claim 1.

8. A curable composition comprising a blend of a $C_4$–$C_7$ isoolefin/p-alkylstyrene polymer having an Mw of 60,000 or more and containing hydroxyl and/or amine functional groups; a blocked polyisocyanate; and optionally a catalyst.

9. The composition of claim 8 wherein the elastomer is a copolymer of isobutylene and p-alkylstyrene.

10. A process for curing the composition of claim 9 comprising heating the blended composition to a temperature sufficient to unblock the polyisocyanate and allow the cure reaction to occur.

11. The process of claim 10 wherein the blend is heated to 150 to 200° C. so as to unblock the polyisocyanate.

12. A cured composition produced by the process of claim 10.

13. A shaped article comprising the composition of claim 12.

* * * * *